US007280031B1

(12) United States Patent
Rodriguez et al.

(10) Patent No.: US 7,280,031 B1
(45) Date of Patent: Oct. 9, 2007

(54) BARRIER OPERATOR SYSTEM WITH ENHANCED TRANSMITTER STORAGE CAPACITY AND RELATED METHODS OF STORAGE AND RETRIEVAL

(75) Inventors: Yan Rodriguez, Canton, OH (US); Richard E Gagnon, Pensacola, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 466 days.

(21) Appl. No.: 10/868,692

(22) Filed: Jun. 14, 2004

(51) Int. Cl.
*H04Q 1/00* (2006.01)

(52) U.S. Cl. ................... 340/5.22; 340/5.23; 340/5.64; 340/5.71

(58) Field of Classification Search ............... 349/5.22, 349/5.23, 5.64, 5.71, 825.22, 825.69, 825.72; 341/176
See application file for complete search history.

(56) References Cited

U.S. PATENT DOCUMENTS

| | | | | |
|---|---|---|---|---|
| 4,228,424 | A | 10/1980 | Le Nay et al. | 340/506 |
| 4,283,710 | A | 8/1981 | Genest et al. | 340/149 R |
| 4,529,980 | A | 7/1985 | Liotine et al. | 340/825.52 |
| 4,750,118 | A | 6/1988 | Heitschel et al. | 364/400 |
| 4,754,255 | A * | 6/1988 | Sanders et al. | 307/10.4 |
| 4,772,876 | A | 9/1988 | Laud | 340/539 |
| 4,847,542 | A | 7/1989 | Clark et al. | 318/560 |
| 4,851,829 | A * | 7/1989 | DeLuca et al. | 340/7.52 |
| 4,855,713 | A | 8/1989 | Brunius | 340/506 |
| 4,881,148 | A | 11/1989 | Lambropoulos et al. | 361/172 |
| 5,077,547 | A | 12/1991 | Burgmann | 340/501 |
| 5,097,505 | A | 3/1992 | Weiss | 380/23 |
| 5,146,215 | A * | 9/1992 | Drori | 340/5.22 |
| 5,148,159 | A | 9/1992 | Clark et al. | 340/825.22 |
| 5,252,960 | A | 10/1993 | Duhame | 340/825.56 |
| 5,291,193 | A | 3/1994 | Isobe et al. | 340/825.69 |
| 5,349,345 | A | 9/1994 | Vanderschel | 340/825.31 |
| 5,408,217 | A | 4/1995 | Sanderford, Jr. | 340/506 |
| 5,473,318 | A | 12/1995 | Martel | 340/825.31 |
| RE35,364 | E | 10/1996 | Heitschel et al. | 364/400 |
| 5,576,701 | A | 11/1996 | Heitschel et al. | 340/825.31 |
| 5,635,913 | A | 6/1997 | Willmott et al. | 340/825.22 |
| 5,751,224 | A | 5/1998 | Fitzgibbon | 340/825.22 |
| 5,781,143 | A | 7/1998 | Rossin | 341/173 |
| 5,854,593 | A | 12/1998 | Dykema et al. | 340/825.22 |
| 5,872,513 | A * | 2/1999 | Fitzgibbon et al. | 340/5.28 |
| 5,907,288 | A | 5/1999 | Clark et al. | 340/825.31 |
| 5,945,936 | A | 8/1999 | Issa | 341/176 |
| 6,049,289 | A | 4/2000 | Waggamon et al. | 340/825.31 |
| RE36,703 | E | 5/2000 | Heitschel et al. | 700/90 |
| 6,081,203 | A | 6/2000 | Fitzgibbon | 340/825.72 |
| 6,181,255 | B1 | 1/2001 | Crimmins et al. | 340/825.69 |
| 6,414,587 | B1 | 7/2002 | Fitzgibbon | 340/5.22 |
| RE37,986 | E | 2/2003 | Heitschel et al. | 700/90 |
| 6,847,287 | B1 * | 1/2005 | Stottlemyre et al. | 340/5.71 |
| 2003/0214385 | A1 * | 11/2003 | Murray | 340/5.23 |

* cited by examiner

*Primary Examiner*—Edwin C. Holloway, III
(74) *Attorney, Agent, or Firm*—Renner Kenner Grieve Bobak Taylor & Weber

(57) ABSTRACT

A method and related system for enabling receipt and storage of data by an operator from at least two types of transmitters, is disclosed. The method includes designating a number of records in a memory array; sub-dividing the memory array into at least two groups, wherein each group is associated with a specific type of transmitter. The method concludes by determining whether one of the number of records is available for writing of data to a specific one of the transmitters.

19 Claims, 8 Drawing Sheets

FIG−2

BARRIER OPERATOR SYSTEM WITH ENHANCED TRANSMITTER STORAGE CAPACITY AND RELATED METHODS OF STORAGE AND RETRIEVAL

TECHNICAL FIELD

Generally, the present invention relates to a barrier operator system for use on a closure member moveable relative to a fixed member. More particularly, the present invention relates to a barrier operator system that operates with various types of transmitters. More specifically, the present invention relates to a garage door operator that efficiently stores and manages different types of transmitter codes.

BACKGROUND ART

When constructing a home or a facility, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command input signals for the purpose of opening and closing the door from a wireless remote, from a wired or wireless wall station, from a keyless entry device or other similar transmitter device. It is also known to provide safety devices that are connected to the operator for the purpose of detecting an obstruction so that the operator may then take corrective action with the motor to avoid entrapment of the obstruction.

To generate the command input signals that initiate barrier movement between limit positions, it is well known to use a radio frequency or infrared transmitter to actuate the motor and move the door in the desired direction. These transmitter devices allow for users to open and close garage doors without having to get out of their car. These transmitter devices may also be provided with additional features such as the ability to control multiple doors, lights associated with the doors, and other security features. As is well documented in the art, the remote transmitters and operators may communicate with each other by using rolling codes that change after every operation cycle so as to make it virtually impossible to “steal” a code and use it a later time for illegal purposes. An operation cycle may include opening and closing of the barrier while simultaneously turning on and off a light that is connected to the operator.

Normally transmitted radio frequency (RF) codes are temporarily stored in a circular buffer in a memory device maintained by the operator. All the codes from different types of wireless transmitter devices (such as hand held transmitters, wireless keypad transmitters, hands-free transmitters and wireless wall station transmitters) are also stored in the same circular buffer. A circular buffer is a data structure used to pass data from one section of code within the operator to another where the code sections usually have no other interaction with each other. The data to be passed is typically in the form of a stream of data items. A circular buffer is similar to a linear buffer. But, unlike a stack device such as a first-in-last-out buffer or a last-in-first-out buffer which naturally keeps reusing memory as items are popped on and later pulled off of the stack, the circular buffer must work at reusing memory by having the code wrap around to the beginning of the buffer whenever the code gets to the end. In other words, the circular buffer forms an endless queue, wherein the queue functions as an endless first-in-first-out (FIFO) buffer. In addition to the memory for the buffer itself, a circular buffer requires at least one pointer variable. This is used to point to the next available location to place new data into the buffer and the next location containing data to be taken out of the buffer.

Normally the circular buffer will learn a new code from the various wireless devices until the buffer is full. Then, as each subsequent code is learned, one of the old codes is dropped out. In some of the prior art, the old codes are dropped out randomly by the operator and in some operators the codes are dropped out on a first in/first out basis. Issues develop when additional hand held transmitters are added and a wireless wall station or wireless keypad drops out. Many times this is not realized until the user tries to operate the door operator from the device that has been dropped out and determines that the operator no longer recognizes the signal from the device. In view of the primary importance and use of a wall station or keypad transmitter, the loss thereof can be very disconcerting to the end-user.

Known prior art references confirm the use of circular buffers as illustrated in U.S. Pat. No. 5,097,505 to Weiss which discloses a method and apparatus for performing personal identification and/or verification at predetermined stations or checkpoints. Each person to be identified has a unit such as a card, badge or other token or device which stores a predetermined coded value, at least a predetermined portion of which is changed at selected time intervals in accordance with an algorithm. The value of the predetermined portion of the stored code at any given time is non-predictable based upon the algorithm. The unit has a triggering signal generator, the unit being responsive to the triggering signal to present an indication of the current stored code value to the station, wherein the station responds to the predetermined code value for identifying the person. Triggering may be in response to detection of a predetermined beacon from the station, in response to a user keypad input, or may be periodically generated. Security may be enhanced by the person inputting a unique personal identification number (PIN) at the unit wherein the PIN is utilized in generating the non-predictable codes. The PIN input may also be used for triggering. Verification may be achieved by including a public code as part of the code which is presented from the unit when the public code is not changed.

U.S. Pat. No. 5,576,701 to Heitschel, et al. discloses a door actuating system which includes a keypad type remote transmitter for transmitting door open request signals generated by pressing the keys of the keypad. The system also includes a stored code type remote transmitter wherein a code stored in long-term storage for transmitting door open requests includes the stored code. A receiver selectively opens the door responsive to the door open requests from both types of remote transmitters. The receiver includes a user settable security switch which inhibits selective door actuation responsive to door open request signals from the stored code type transmitter while permitting selective door actuation responsive to door open request signals from keypad type transmitters.

U.S. Pat. Nos. 5,751,224; 6,081,203; and 6,414,587 to Fitzgibbon disclose a movable barrier or garage door operator which has a control head controlling an electric motor connected to a movable barrier or garage door. The control head has an RF receiver for receiving RF signals from a hand-held transmitter or a fixed keypad transmitter. The receiver operates the electric motor upon matching a received code with a stored code. The stored codes may be updated or loaded either by enabling the learn mode of the receiver from the fixed keypad transmitter or from a wired control unit positioned within the garage.

Although the above listed patents disclose the receipt and use of codes for association with operators and operator-like devices, none specifically address the problem of a code associated with a transmitter device being overwritten by a later-learned transmitter device. Therefore, there is a need in the art for a barrier operator system that distinguishes between the types of transmitters learned so that certain types of transmitters are not inadvertently overwritten.

DISCLOSURE OF THE INVENTION

One of the aspects of the present invention, which shall become apparent as the detailed description proceeds, is achieved by a barrier operator system with enhanced transmitter storage capacity and related methods of storage and retrieval.

Another aspect of the present invention is attained by a method for enabling receipt and storage of data by an operator from at least two types of transmitters, comprising designating a number of records in a memory array; sub-dividing the memory array into at least two groups, wherein each group is associated with a specific type of transmitter; and determining whether one of the number of records is available for writing of data associated with a specific one of the transmitters.

Other aspects of the present invention are attained by a barrier operator system for controlling movements of a barrier between limit positions, comprising at least two types of transmitters capable of generating an identifiable transmitter signal; a controller for receiving the identifiable transmitter signals; and a memory device associated with the controller, the memory device having a memory array sub-divided into groups, wherein each group is associated with a specific type of the transmitters.

Still another object of the present invention is attained by a computer readable medium used with a barrier operator system having stored thereon a data structure comprising an array of data records representing a plurality of transmitters which is segmented into a least two groups representative of different types of transmitters; a validity field associated with each of the data records, wherein the validity field indicates whether the record is either usable or unusable; and an overwrite field associated with each of the data records, wherein the validity field indicates whether the data record is either writable or unwritable.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
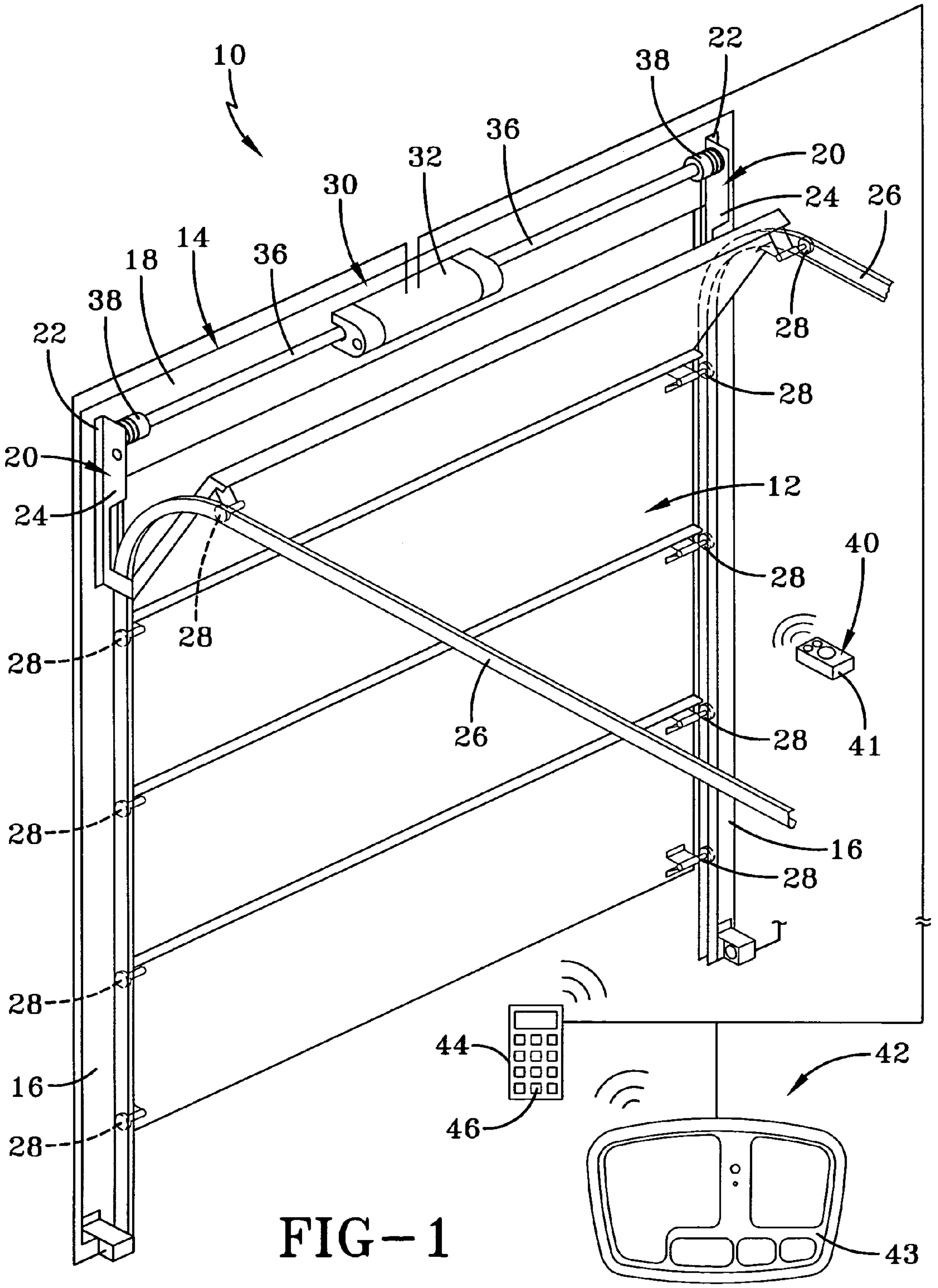
FIG. 1 is a perspective view depicting a sectional garage door and showing an operating mechanism embodying the concepts of the present invention.

A garage door operator system which incorporates the concepts of the present invention is generally designated by the numeral 10 in FIG. 1. Although the present discussion is specifically related to a garage door operator, it will be appreciated that the teachings of the present invention are applicable to any type of device responsive to different types of learned transmitters. In any event, the system 10 is employed in conjunction with a conventional sectional garage door generally indicated by the numeral 12. The door 12 may or may not be an anti-pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground. The jambs 16 are spaced and joined at their vertical upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

A counterbalancing system generally indicated by the numeral 30 may be employed to balance the weight of the garage door 12 when moving between open and closed positions. One example of a counterbalancing system is disclosed in U.S. Pat. No. 5,419,010, which is incorporated herein by reference. Generally, the counter-balancing system 30 includes a housing 32, which is affixed to the header 18 and which contains an operator mechanism 34 best seen in FIG. 2. Extending through the operator housing 32 is a drive shaft 36, the opposite ends of which carry cable drums 38 that are affixed to respective projecting legs 24. Carried within the drive shaft 36 are counterbalance springs as described in the '010 patent. Although a header-mounted operator is disclosed, the control features to be discussed later are equally applicable to other types of operators used with movable barriers. For example, the control routines can be easily incorporated into trolley type operators used to move garage doors. The drive shaft 36 transmits the necessary mechanical power to transfer the garage door 12 between closed and open positions. In the housing 32, the drive shaft 36 is coupled to a drive gear wherein the drive gear is coupled to a motor in a manner well known in the art.

Briefly, the counter-balancing system 30 may be controlled by a wireless remote transmitter 40, which has a housing 41, or a wall station control 42, which has a housing 43, that is wired directly to the system 30 or which may communicate via radio frequency or infrared signals. The wall station control 42 is likely to have additional operational features not present in the remote transmitter 40. The housing 43 has a plurality of buttons thereon which may be associated with specific functional features. The system 30 may also be controlled by a keyless alphanumeric device 44. The device 44, which may also be referred to as keypad, may include a display and a plurality of keys 46 with alphanumeric indicia thereon. Actuating the keys 46 in a predetermined sequence allows for actuation of the system 30. At the least, the devices 40, 42 and 44 are able to initiate opening and closing movements of the door coupled to the system 30. Although the present invention is described in the context of a sectional garage door, the teachings of the invention are equally applicable to other types of movable barriers such as single panel doors, gates, windows, retractable overhangs and any device that at least partially encloses an area.

Figure 2:
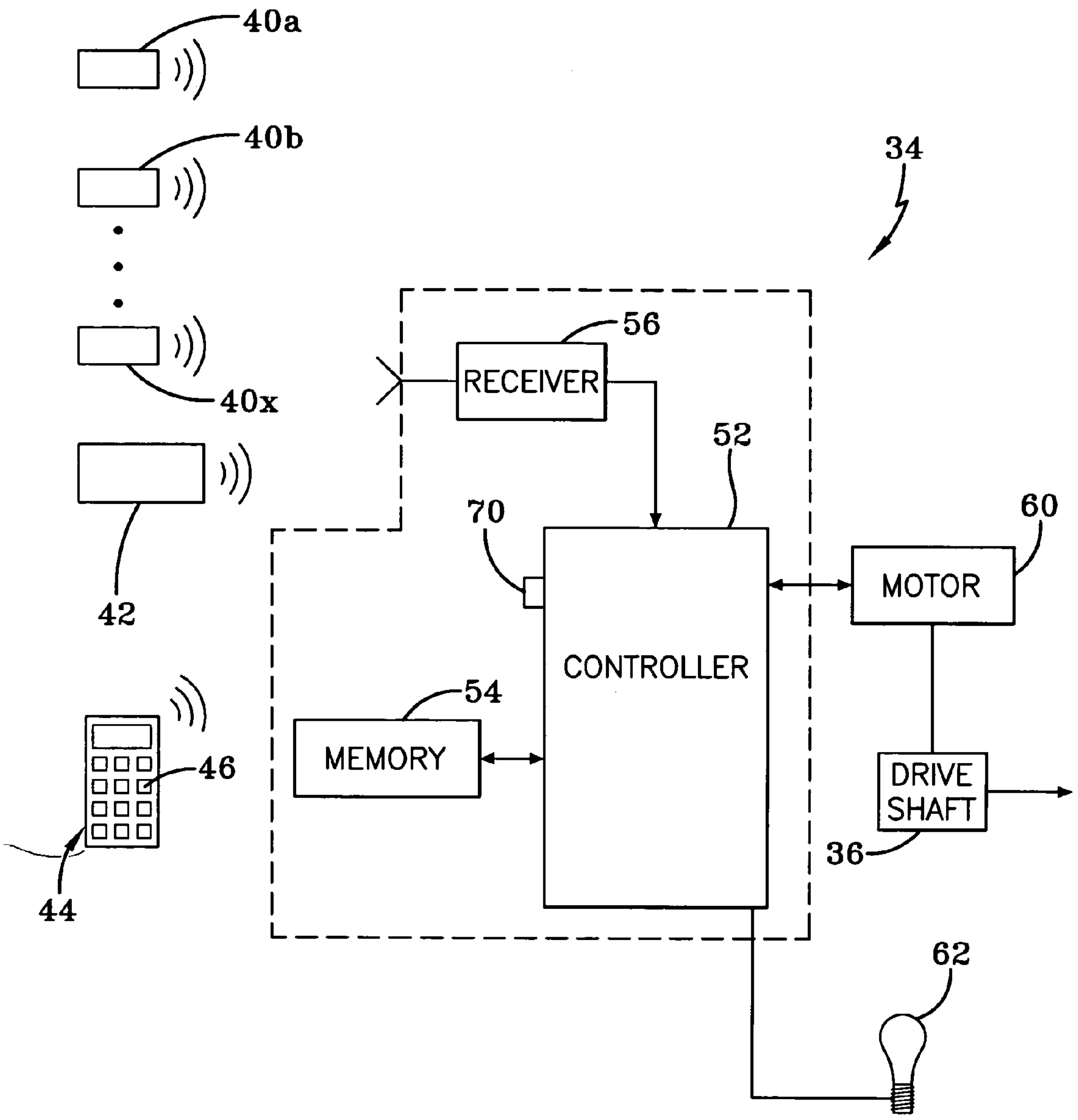
FIG. 2 is a schematic drawing of an operator according to the present invention.

An operator mechanism, which is designated generally by the numeral 34 in FIG. 2, is contained within the housing 32 and monitors operation of the motor and various other elements connected to the operator mechanism 34 as will be described hereinbelow. Independent power sources used to independently energize the operator and the transmitters.

The operator mechanism 34 includes a controller 52 which incorporates the necessary software, hardware and memory storage devices for controlling the operation of the operator mechanism 34. In electrical communication with the controller 52 is a non-volatile memory storage device 54 for permanently storing information utilized by the controller in conjunction with the operation of the operator mechanism 34. It will be appreciated that it may be internally incorporated within the controller. It will further be appreciated that the memory device may be embodied in any type of computer-readable medium that is accessible by the controller 52. Infrared and/or radio frequency signals are received by a receiver 56 which transmits the received information to a decoder contained within the controller. The controller 52 converts the received radio frequency signals or other types of wireless signals into a usable format. It will be appreciated that an appropriate antenna is utilized by the receiver 56 for receiving the desired signals. It will also be appreciated that the controller 52 is capable of directly receiving transmission type signals from a direct wire source as evidenced by the direct connection to the wall station 42. And the keyless device 44, which may also be wireless, is also connected to the controller 52. Any number of remote transmitters 40*a-x* can transmit a signal that is received by the receiver 56 and further processed by the controller 52 as needed. Likewise, there can be any number of wall stations or keypad devices. If the input signals received from either the remote transmitter 40, or the wall station control 42 or the keyless device 44 are acceptable, the controller 52 generates the appropriate electrical input signals for energizing the motor 60 which in turn rotates the drive shaft 36 and opens or closes the movable barrier. A light 62, which may be turned on and off independently or whenever an open/close cycle is initiated, may also be connected to the controller 52.

Figure 3:
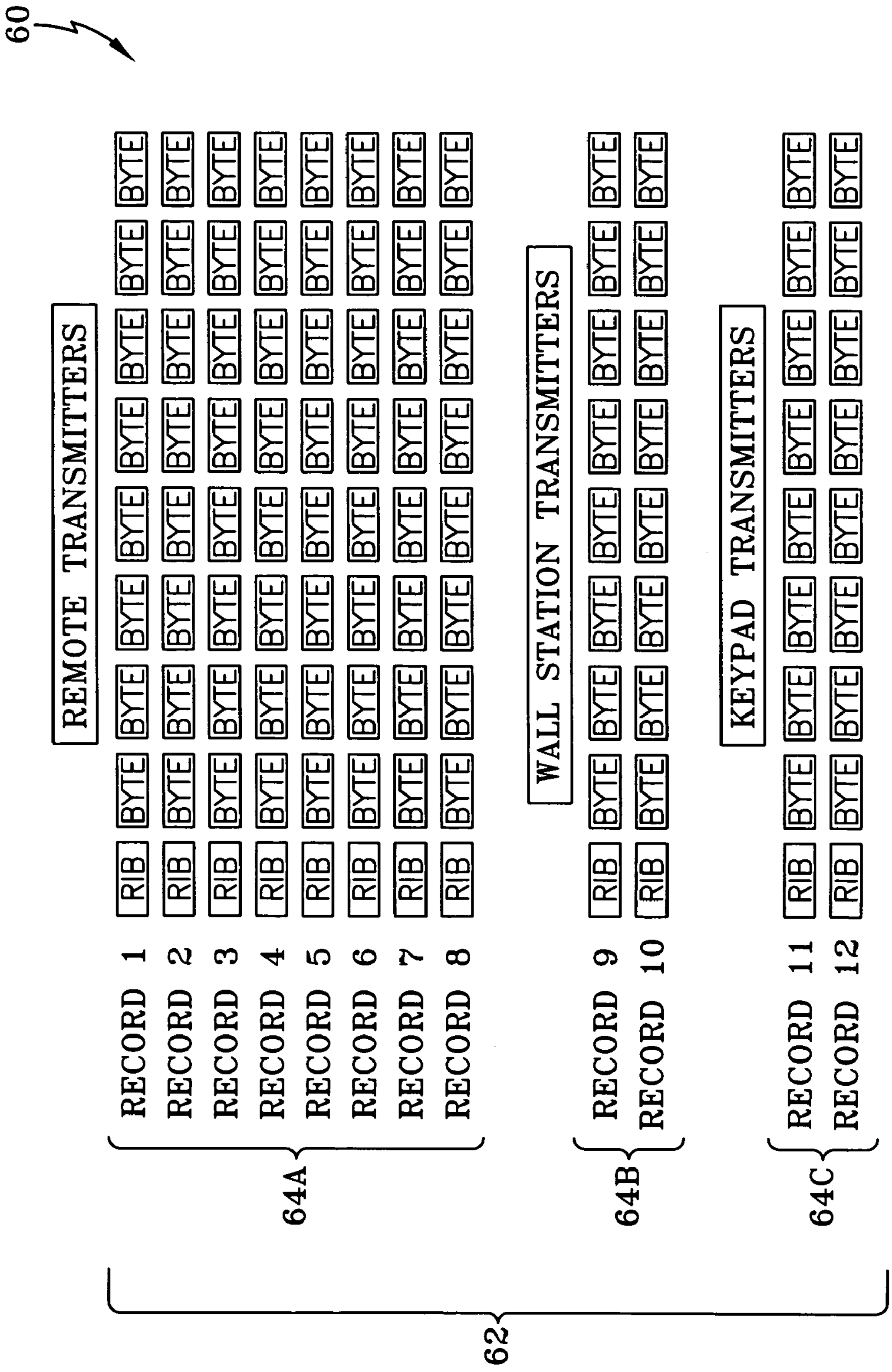
FIG. 3 is a representation of a data structure incorporated into the operating mechanism.

Referring now to FIG. 3 it can be seen that a memory array is designated generally by the numeral 60, wherein the array is incorporated into the memory storage device 54. The array 60 includes a plurality of records 62, wherein the preferred embodiment provides twelve records. It will be appreciated that more or less records could be contained within the array. The array 60 is subdivided into groups designated generally by the numeral 64 wherein the array includes at least two groups although three are shown and more than three groups could be designated. The groups 64 are associated with the different types of transmitters that are capable of communicating with the controller 52. In particular, the group 64A, which includes eight records, is set aside for all of the remote transmitters that can be associated with the operator system. Group 64B is associated with the wall station transmitters, of which there are two, and group 64C is associated with the keypad transmitters of which there are two. It will further be appreciated that the number of transmitters associated with each particular group may be adjusted and preferably there are at least two transmitters within each group.

Each record has a plurality of bytes to be associated with a learned transmitter and a Record Information Byte designated in the drawing as RIB. The specific bits in each RIB are identified by an alphanumeric designation such as b0, b1, b2, b3, b4, b5, b6 and b7. As will be discussed in detail, each of these specific bits is either a logical 0 or a logical 1 which may or may not be permanently designated. The remaining data bytes—all bytes after the RIB—may be adjusted to meet any code length. Data storage can be reduced to accommodate simpler transmitter codes which reduces the amount of memory needed per transmitter. Conversely, the number of data storage bytes can be increased to accommodate more complex codes. Thus, it will be appreciated that the array 60 may be initialized into the three groups in order to maintain separate record blocks for the unique transmitter types provided. In one embodiment, the specific transmitter types stored in the RIB are associated with bits b0, b1 and b2, and bits b3 and b4 may be reserved for additional transmitter types in a "bit test mode." Or bits b0-b4 of the RIB may be set aside for up to 32 unique transmitters in a "word test mode." The RIB contains information about a learned transmitter that enables the data record to be accessed in an efficient manner and to allocate space when new information needs to be stored. All of the remaining bytes associated with a record are set aside for a transmitter's serial number, a corresponding synchronization code, and corresponding transmitter button codes that are used to implement specific operator functions. It will further be appreciated that implementation and use of the array 60 does not require a memory record pointer.

Figure 4A:
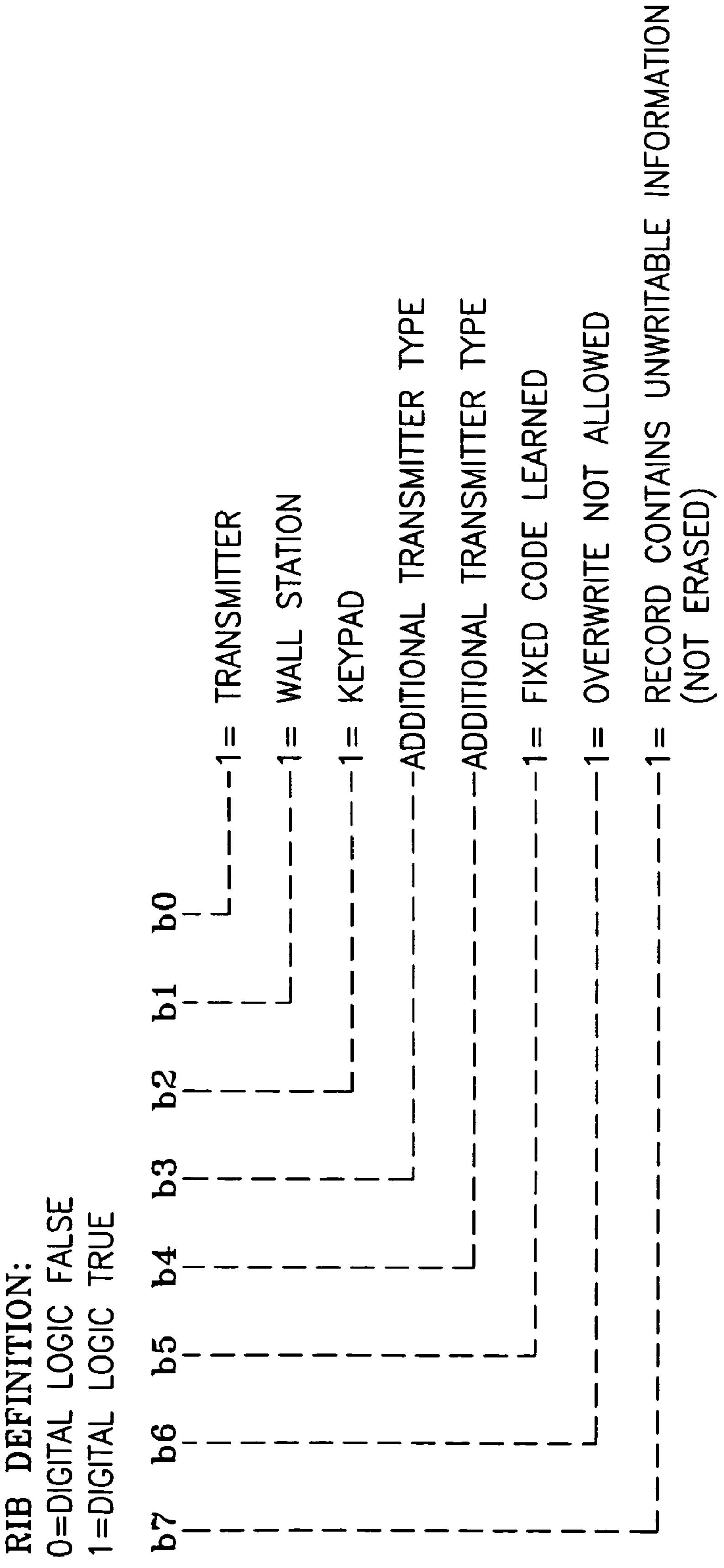
FIGS. 4A and 4B are representations of a bit test mode and a word test mode, respectively, of a record incorporated into the data structure.

Referring now to FIG. 4A, the bit test mode, designated generally by the numeral 70A, is shown. From this diagram it can be seen that the state or condition of the bits (1 or 0) in the RIB allows the controller to recognize a specific transmitter type. In other words, if the bit b0 is designated as a 1, the controller reserves this data record for a remote transmitter. Accordingly, all the other bits b1-b4 are designated as 0. This designation of bits reduces processing overhead but it does limit the number of transmitter types to the number of bits assigned for each transmitter type. Since, in this example, there are five bits; up to five transmitters can be assigned within an array. For example, bit b3 may be reserved for hands-free transmitters which the controller recognizes depending upon the transmitter's proximity and direction of travel with respect to the controller.

Figure 4B:
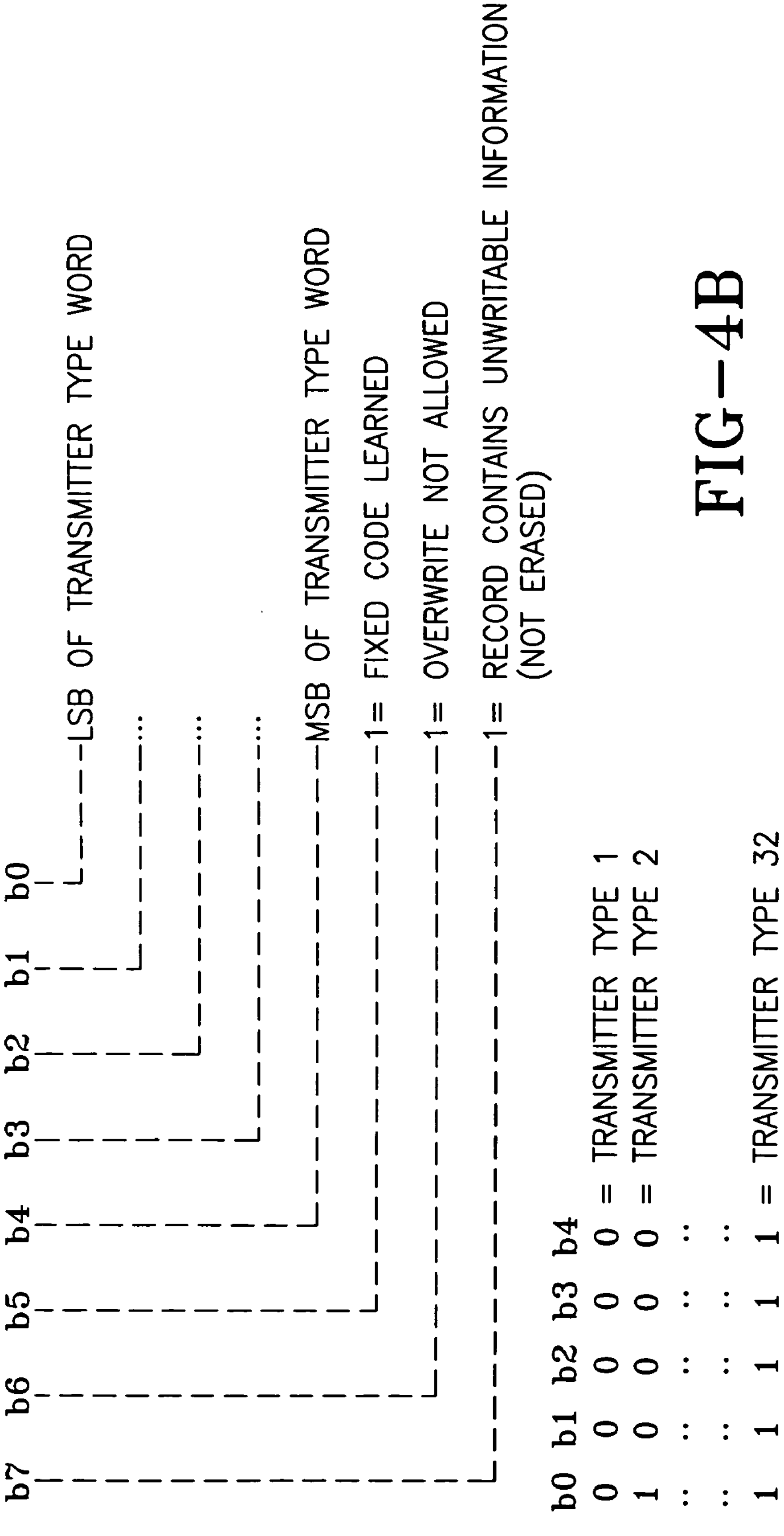

Referring now to FIG. 4B, it can be seen that the word test mode uses a similar structure as the bit test mode, except that bits b0-b4 are combined to make a transmitter type word. In order to test for a transmitter type, the combination of all five bits is tested. This method increases the processing overhead to determine the type of transmitter, but it increases the number of transmitter types with the least amount of RIB bits being used. Accordingly, with the five bits readily available for designation, up to thirty-two transmitter types can be assigned. It will further be appreciated that these thirty-two transmitter types may be grouped accordingly.

Referring now to FIGS. 4A and 4B, both modes designate the remaining bits as follows. Bit b5 is designated for the purpose of determining whether a fixed code has been learned or not. In other words, if bit 5 is designated as "1" then a fixed code has been learned. If bit b5 is designated as "0" then a fixed code has not been learned for that particular record. Bit b6 designates whether or not an overwrite condition is allowed. In other words, if b6 is set to 1 then that record is considered to be unwritable. If bit b6 is set to 0 then the bit and the record is considered to be writable. Bit b7 determines whether the record contains usable information. If bit b7 has a value of 1, then the record contains usable information and may not be erased. However, if bit b7 has a value of 0, then the record contains unusable information and may be ignored. Initially, when the operator system is shipped from the factory, bits b5, b6 and b7 are set to the logic false condition or in other words, all are set to a value of 0. As different types of transmitters are learned to the controller, the conditions of b5-b7 are adjusted accordingly.

The controller 52 interacts with the array 60 to perform three primary functions. The first is data storage, the second is data retrieval, and the last is data erasure. These various data functions are described below in the context of the bit test mode, but it will be appreciated that they are equally applicable to the word test mode.

Figure 5:
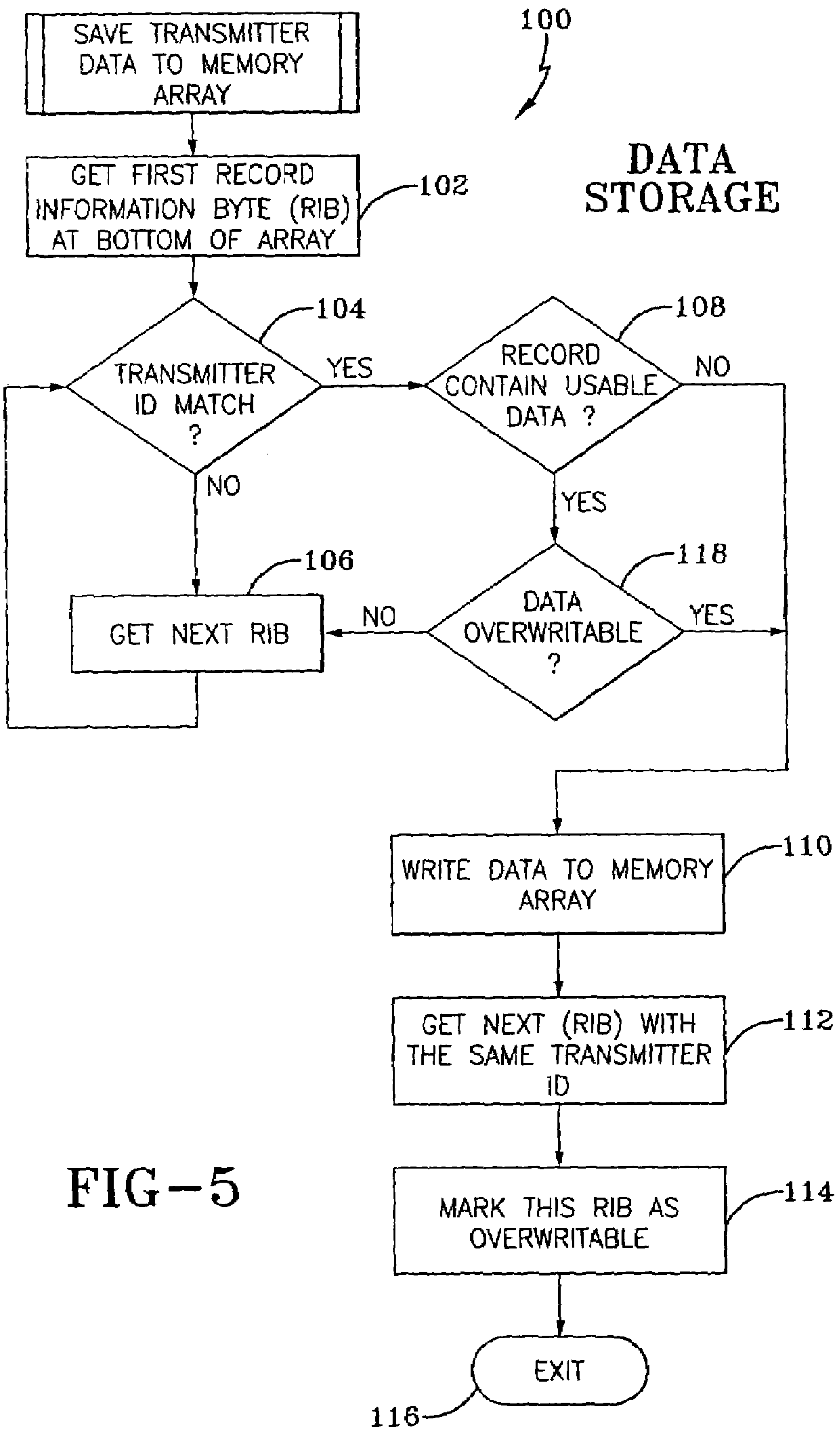
FIG. 5 is an operational flow chart illustrating storage of transmitter serial numbers in the data structure.

Referring now to FIG. 5, it can be seen that a methodology for storing data in the memory array is designated generally by the numeral 100. Initially, it will be appreciated that the controller is placed into a learn mode by any number of means such as actuation of a button associated with a controller or by the sending of a radio frequency signal to the controller that enables a learning mode. Once the transmitter data is stored in the memory array, the learned transmitter is approved for use which allows for it to be used with the operating system. At step 102, the controller 52 accesses the first record information bit at the bottom of the array which in this example is associated with record 12. Next, at step 104, the controller inquires as to whether the transmitter identification received from the transmitter to be learned matches the transmitter identification of the particular record. Accordingly, in this particular example, the controller inquires from record 12 as to whether the transmitter bit b2 in the corresponding RIB is designated as a 1 value. If not, then the process proceeds to step 106 and the next records's RIB in the array is obtained and step 104 is repeated. This repeating of steps 104 and 106 continues until a transmitter ID is matched. Accordingly, if a remote transmitter is being learned in this example, then a transmitter ID match will not occur until record 8 is queried. Once a transmitter ID match has been made, then the process continues to step 108 to determine whether the record contains usable data. In other words, the controller inquires as to whether bit b7 of the corresponding is set to a 0 or a 1. As such, if bit b7 is set to a 0 then the process continues step 108. Since this record is available, then at step 110, the learned transmitter is written to the memory array and in particular, a serial number associated with the new transmitter is stored in the record's bytes designated for that purpose. Next, at step 112, the next available record with the same transmitter ID, which in this example would be record 7, the bit b6 is set equal to 0. In other words, the RIB of record 7 is designated as overwritable. At this time, the data storage procedure is exited at step 116.

Steps 108 through 116 are repeated, as needed, until all of the records within a group are filled with learned transmitters. It will be appreciated that over a period of time some transmitters may become lost or rendered inoperative and new transmitters may be learned. Accordingly, at some point in time all of the available records will contain usable data. This is tested at step 108 by determining whether bit b7 is equal to 1. If bit b7 for all of the records in the group is equal to 1, then upon attempting to learn a new transmitter, the process continues to step 118 to determine whether the record under evaluation is considered to be overwritable. In other words, the controller determines whether a record's RIB bit b6 is equal to 1 or if it is equal to 0. If it is determined that bit b6 is equal to 1, then the process continues to step 106 to obtain the next available record and the process repeats steps 104 and 108. This loop of steps 118, 106, 104 and 108 continues within the group until the record that has bit b6 equal to 0 is located which indicates that this particular record my be overwritten. When this is the case, steps 110-116 are executed as described above. Accordingly, the methodology 100 allows for learning of new transmitters and upon learning of each new transmitter, the record immediately adjacent the new learned record within that group is set to be overwritable. In this manner, when a new transmitter is learned, the next oldest transmitter is designated as being overwritable. It will further be appreciated that by segmenting the array into groups associated with particular transmitters that the learning of a remote transmitter will not inadvertently delete a more important type of transmitter such as a wall station or keypad. As noted, these types of transmitters are used by most all users and necessitate a higher priority then a remote transmitter.

Figure 6:
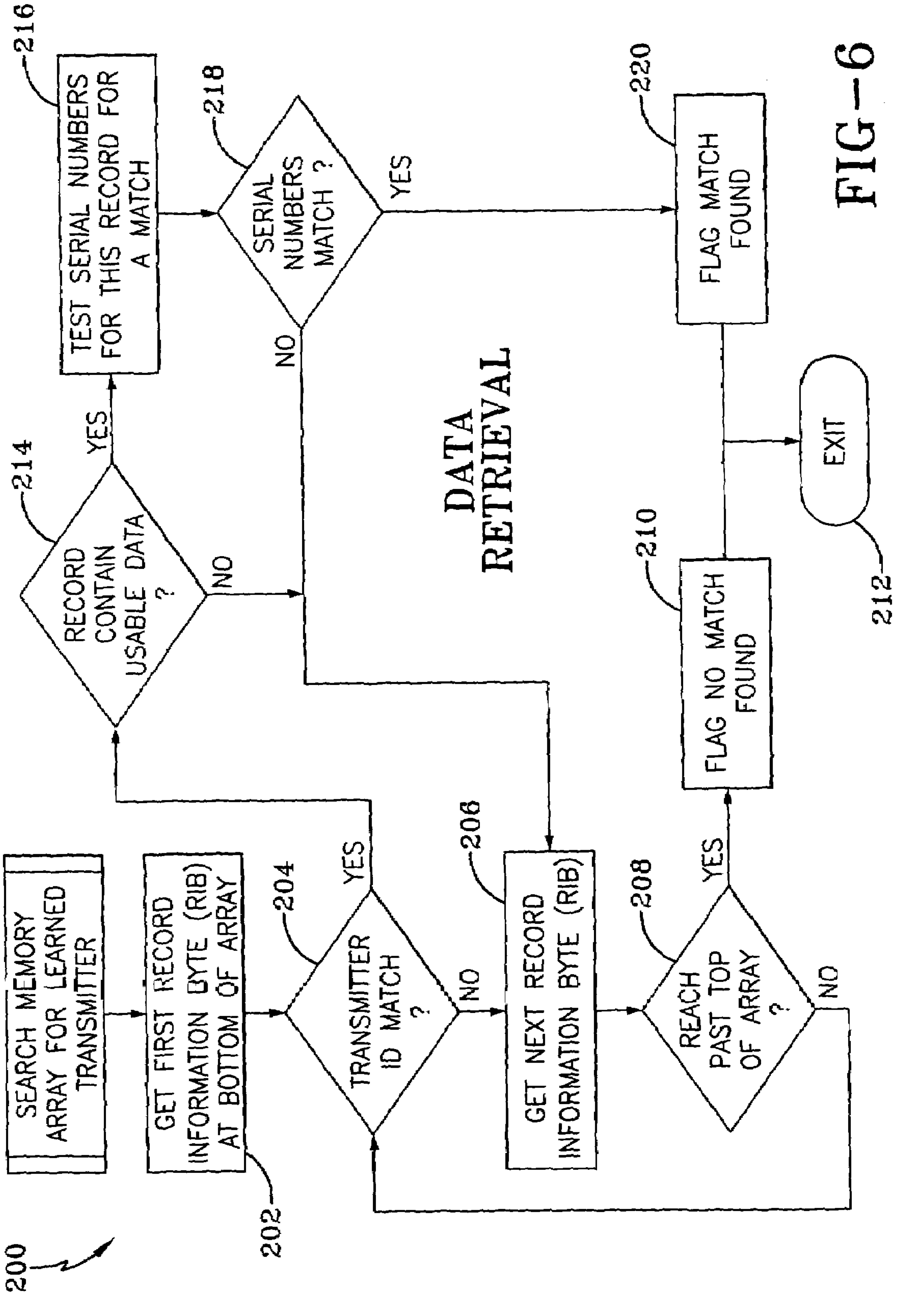
FIG. 6 is an operational flow chart illustrating retrieval and confirmation of the transmitter serial numbers in the data structure.

Referring now to FIG. 6, it can be seen that a methodology for retrieving data from the memory array is designated generally by the numeral 200. In this methodology, the controller is in an actual use mode and each transmitter transmission is checked to ensure that it is included in the memory array and approved for use with the controller. Accordingly, at step 202, upon receipt of a transmitter signal, the controller obtains the first record information byte at the bottom of the array. Next, the controller determines whether the transmitter identification received matches the RIB found at the bottom of the array. If a match is not found, then at step 206 the next record information byte is accessed. At step 208 an inquiry is made as to whether the sequence has passed the top of the array. If not, then the process returns to step 204 for repeating of that step. If, however, at step 208 it is determined that the controller has reached passed the top of the array, then at step 210 a flag "no match found" is designated and the process exits at step 212.

Returning to step 204 if a transmitter ID match is positively made then the process continues to step 214 to determine whether the RIB under scrutiny contains usable data or not. If the bit b7 is equal to 1—usable data—then the serial number of the received transmission is tested at step 216 to determine whether it matches the serial number and related information stored in the associated data bytes. At step 218 if the serial number does not match, then the process returns to step 206 to obtain the next record information byte so that the steps 208 and 204 may be repeated. If at step 218 a serial number is matched with the record, then at step 220 a flag "match found" is set indicating that the serial number is stored within the record or associated therewith and that the controller may respond to the received command. Upon completion of this step the procedure is exited. If at step 214 it is determined that bit b7 does not contain usable data—bit b7 is at 0—then the process returns to step 206 to obtain the next record information byte. This data retrieval process effectively utilizes the memory array such that a memory pointer is not required and the overall processing of the signal is much faster and more reliable.

Figure 7:
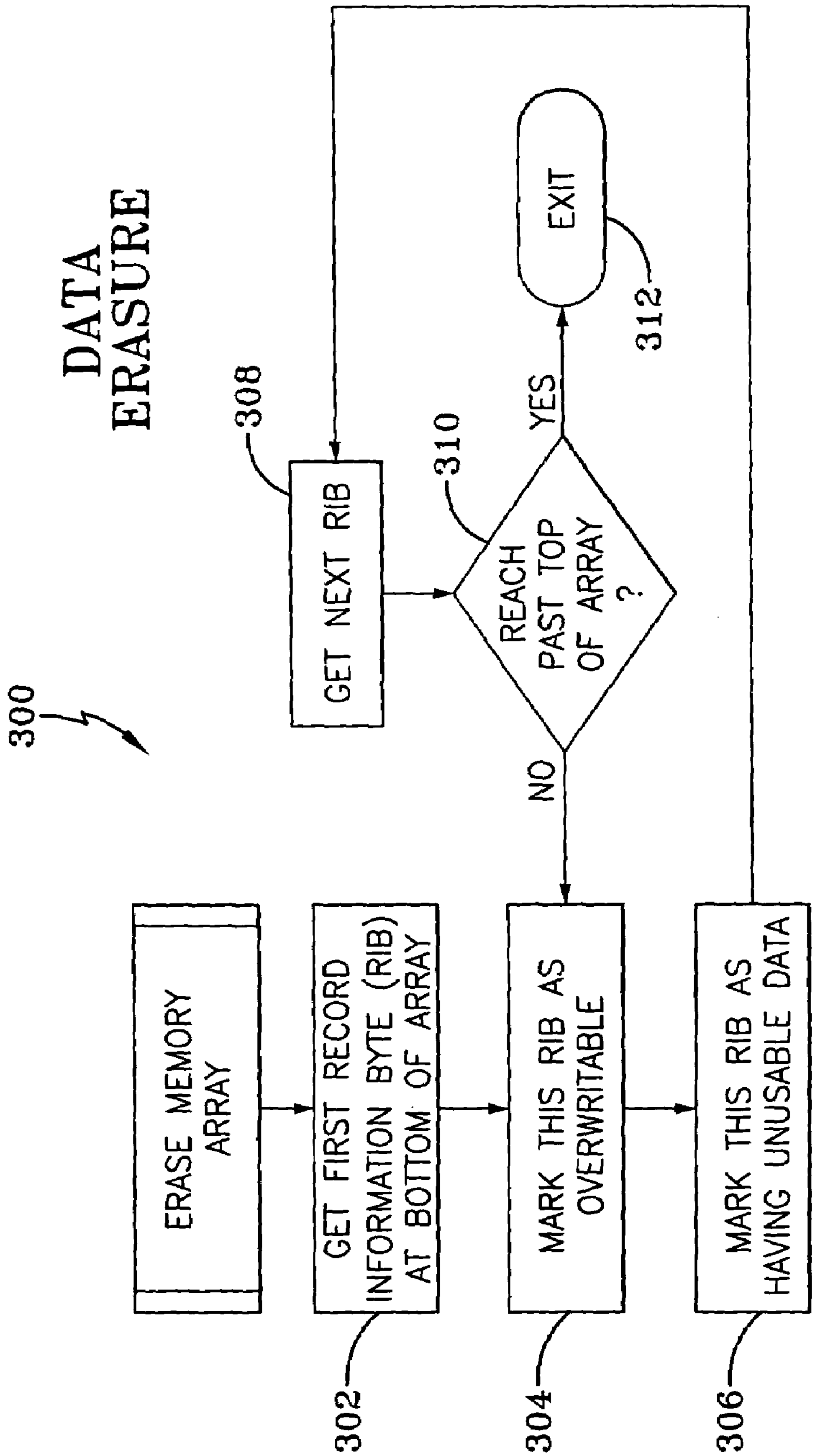
FIG. 7 is an operational flow chart illustrating erasure of selected records in the data structure.

Referring now to FIG. 7, it can be seen that a methodology for data erasure of selected bits in the records in the array is designated generally by the numeral 300. At step 302, the controller obtains the first record information bit at a bottom of the array. Next, at step 304, the controller marks this RIB as overwritable by setting the bit b6 equal to 0. At step 306, the record is designated as having unusable data by setting the bit b7 equal to 0. Upon completion of step 306, the process proceeds to step 308 and the controller obtains the next record information bit. If at step 310 it is determined that the top of the array has not been reached then steps 304, 306 and 308 are repeated. If however, at step 310 it is determined that the top of the array has been passed, then at step 312 the data erasure process is exited. The data erasure process may be entered by holding a program button in for a predetermined period of time or by actuating the transmitter keys in a predetermined fashion.

The data storage, retrieval, and erasure methodologies; and the structure of the data array provide numerous advantages. In particular, use of the data array in the manner described above eliminates the need for a memory record pointer. Such a data array provides sufficient memory to store a plurality of codes or records and allows for the recognition and storage of more than one unique type of transmitter device. The array's data structure is configured so that at least two records are set aside for wall stations and at least another two records are set aside for wireless keypads. It will be appreciated that the data structure is adaptable to handle a large number of records or codes and also allows for the simplification of code or record searching by the processing device. This allows for more valuable memory space to be utilized for other tasks associated with the use of the operating system.

Thus, it should be evident that the operator system and method for enhanced transmitter storage capacity disclosed herein carries out one or more of the objects of the present invention set forth above and otherwise constitutes an advantageous contribution to the art. As will be apparent to persons skilled in the art, modifications can be made to the preferred embodiments disclosed herein without departing from the spirit of the invention, the scope of the invention herein being limited solely by the scope of the attached claims.

What is claimed is:

1. A method for enabling receipt and storage of data by a movable barrier operator from a plurality of transmitter devices, each transmitter device maintaining a transmitter code and a unique serial number, each transmitter device having specific operational features, the method comprising:

designating a number of records in a memory array maintained by the operator;

sub-dividing said records into at least two groups, wherein each group is associated with the transmitter devices having the same operational features;

associating a predetermined number of binary bits with each of said records;

designating by the operator one of said bits as a validity bit, and some of the remaining said bits as transmitter bits;

receiving a transmitter code from one of the transmitter devices by the operator;

sequentially comparing said transmitter bits of each said record with said transmitter code;

determining whether said transmitter bits of one of said records matches said transmitter code, wherein if a match occurs at said determining step, said validity bit associated with said record is set as usable and said transmitter serial number is associated with said record.

2. The method according to claim 1, further comprising:

designating one of said remaining bits as an overwritable bit.

3. The method according to claim 1, further comprising:

initially designating all of said validity bits as "unusable" and all of said overwritable bits as "writable."

4. The method according to claim 3, further comprising:

storing a transmitter serial number in said record in a first group of transmitters of said array if said validity bit is unusable; and setting said validity bit as "usable" and said overwritable bit as "unwritable" for a first designated record in said first group upon completion of said storing step.

5. The method according to claim 4, further comprising:

accessing a next record within said first group of transmitters; and setting said next available record's overwritable bit as writable.

6. The method according to claim 5, further comprising:

checking said records of said first group of transmitters for any said validity bits designated as usable; and detecting whether said record's corresponding overwritable bit is designated as writable.

7. The method according to claim 6, further comprising:

storing a transmitter serial number in association with said record from the detecting step when said records' overwritable bit is set to writable.

8. The method according to claim 7, further comprising:

checking said validity bit if said transmitter code matches one of said transmitter bits to determine if said validity bit contains usable data;

testing a received transmitter serial number associated with said transmitter code with said stored transmitter serial number;

designating a flag as "match found" if said received serial number matches said stored serial number; and accessing a next record if said received serial number does not match said stored serial number.

9. The method according to claim 8, further comprising:

determining whether all of said records have been accessed while checking said transmitter bits for said transmitter codes and testing said received serial numbers and, if so, designating another flag as "no match found."

10. The method according to claim 4, further comprising:

receiving an erasure signal; and accessing each said record and designating said validity bit as unusable and said overwritable bit as writable.

11. A barrier operator system for controlling movements of a barrier between limit positions, comprising:

a plurality of transmitter devices, each transmitter device capable of generating a uniquely identifiable transmitter code;

a controller for receiving said uniquely identifiable transmitter code;

a memory device associated with said controller, said memory device having a memory array sub-divided into groups, wherein each group is associated with said transmitter devices having the same operational features; and at least one record associated with each group, each said record maintaining a validity bit, an overwrite bit, and one or more transmitter bits, wherein a serial number of said transmitter is associated with said record if said transmitter bits match said uniquely identifiable transmitter code and said validity bit is set to usable by said controller.

12. The system according to claim 11, wherein all of said validity bits are initially set to unusable, and all of said overwritable bits are initially set to writable.

13. The system according to claim 12, wherein said controller is placed in a storage mode, wherein said uniquely identifiable transmitter codes are receivable by said controller and associated with one of said records in said groups, and wherein each associated record is modified so that a respective said validity bit is set as usable and a respective said overwritable bit is set as unwritable.

14. The system according to claim 13, wherein said controller, while in said storage mode, accesses a next record within said group after setting said respective validity bit as unwritable and sets said next record's overwritable bit as writable.

15. The system according to claim 14, wherein said controller, while in said storage mode, checks said groups for validity bits designated as usable, and when all said validity bits are designated as usable, said controller checks for an overwritable bit within said group designated as writable and stores said most recently received transmitter code within said record, and resets an adjacent record's overwritable bit within said transmitter group from unwritable to writable.

16. The system according to claim 15, wherein said controller is placed in a data retrieval mode and receives said transmitter codes for comparison with said records within said memory device, wherein said received transmitter type codes match with said transmitter bits of at least one said record.

17. The system according to claim 16, wherein said controller, if said received transmitter code matches said transmitter bit of at least one of said records, compares a received serial number associated with said received transmitter code with a record's stored serial number and if a match is found sets a flag to "match found."

18. The system according to claim 17, wherein said controller sets another flag to "no match found" if said received serial number does not match any of said records' stored serial number.

19. The system according to claim 18, wherein said controller is placed in a data erasure mode, and wherein said controller sets all of said validity bits to usable and all of said overwritable bits to writable.

* * * * *